US012781558B2

(12) United States Patent
Chen et al.

(10) Patent No.: US 12,781,558 B2
(45) Date of Patent: Nov. 3, 2026

(54) ECCENTRIC CAM ACTION DOOR CLOSER FOR GLASS DOOR

(71) Applicant: SUN-Q DOOR CONTROLS LIMITED, Yuanlin City (TW)

(72) Inventors: Tsung-Ching Chen, Yuanlin City (TW); Yuan-Man Chen, Dongguan City (CN)

(73) Assignee: SUN-Q DOOR CONTROLS LIMITED, Yuanlin City (TW)

(*) Notice: Subject to any disclaimer, the term of this patent is extended or adjusted under 35 U.S.C. 154(b) by 0 days.

(21) Appl. No.: 18/987,819

(22) Filed: Dec. 19, 2024

(65) Prior Publication Data

US 2025/0207448 A1 Jun. 26, 2025

(30) Foreign Application Priority Data

Dec. 20, 2023 (CN) ......................... 202323487806.1

(51) Int. Cl.
*E05F 3/00* (2006.01)
*E05F 3/10* (2006.01)

(52) U.S. Cl.
CPC ......... *E05F 3/104* (2013.01); *E05Y 2201/456* (2013.01); *E05Y 2201/638* (2013.01); *E05Y 2201/688* (2013.01); *E05Y 2900/132* (2013.01)

(58) Field of Classification Search
CPC ..... E05F 3/104; E05F 3/10; E05F 3/20; E05F 3/224; E05F 3/223; E05F 3/225; E05F 3/227; E05F 3/04; E05Y 2201/156; E05Y 2201/47; E05Y 2201/456; E05Y 2201/638; E05Y 2201/682; E05Y 2201/688; E05Y 2201/706; E05Y 2800/268;
(Continued)

(56) References Cited

U.S. PATENT DOCUMENTS 3,021,556 A * 2/1962 Pittenger .................. E05F 3/06
267/155
3,474,485 A * 10/1969 Mittig ..................... E05F 3/104
16/55

(Continued)

FOREIGN PATENT DOCUMENTS

EP 3401485 A1 * 11/2018 .............. E05F 3/104
KR 101186017 B1 * 9/2012 ............. E05D 7/081

(Continued)

*Primary Examiner* — Chuck Y Mah
(74) *Attorney, Agent, or Firm* — MUNCY, GEISSLER, OLDS & LOWE, P.C.

(57) ABSTRACT

The present invention relates to a structurally novel eccentric cam action door closer for a glass door. The matching of the first and second rollers on the piston pressing assembly with the eccentric cam on the cam shaft realizes the door closer stably keeps the door in the opened or closed state. When the door is clockwise opened in place, the first roller is embedded in the first opening arc recess, thereby fixed to the eccentric cam. When the door is counterclockwise opened in place, the second roller is embedded in the second opening arc recess, thereby fixed to the eccentric cam. When the door is closed in place, the first and second rollers are embedded in the first and second closing arc recesses, thereby fixed to the eccentric cam. Thus, the cam shaft is stopped from rotating, achieving door angle fixing effect and stopping the door.

6 Claims, 2 Drawing Sheets

(58) Field of Classification Search
CPC ......... E05Y 2800/676; E05Y 2900/132; E05Y 2900/146; E05Y 2900/148; E05Y 2600/452; E05Y 2600/41; E05Y 2201/212; E05Y 2800/298; E05D 7/086; E05D 7/10; E05D 3/02; E05D 5/10; E05D 5/14; E05D 9/005; E05D 11/0054; E05D 11/02
USPC ..................................... 16/71–72, 49, 51–53
See application file for complete search history.

(56) References Cited

U.S. PATENT DOCUMENTS

| | | | | | |
|---|---|---|---|---|---|
| 5,709,009 | A * | 1/1998 | Lasson | F15B 21/06 16/48.5 |
| 5,901,412 | A * | 5/1999 | Jentsch | E05F 3/104 16/60 |
| 10,995,533 | B2 * | 5/2021 | Wörner | E05F 3/223 |
| 2005/0177975 | A1 * | 8/2005 | Wang | E05F 3/04 16/60 |
| 2006/0123598 | A1 * | 6/2006 | Park | E05F 3/225 16/378 |
| 2013/0081227 | A1 * | 4/2013 | Hensh | E05F 3/104 16/53 |
| 2020/0308890 | A1 * | 10/2020 | Yu | E05F 3/104 |

FOREIGN PATENT DOCUMENTS

| | | | | | |
|---|---|---|---|---|---|
| KR | 101996360 | B1 * | 7/2019 | E05F 3/10 |
| KR | 20200029211 | A * | 3/2020 | E05D 7/0054 |

* cited by examiner

ECCENTRIC CAM ACTION DOOR CLOSER FOR GLASS DOOR

BACKGROUND OF THE INVENTION

1. Field of the Invention

The present invention belongs to the technical field of door closers, and particularly relates to an eccentric cam action door closer for a glass door.

2. Description of the Related Art

A door closer is a spring-like hydraulic device on the door head. After the door is opened, the door closer can be compressed and then released to automatically close the door. It acts like a spring door, and can ensure that after the door is opened, the door closes accurately and promptly to the initial position.

During the spring release process of the door closer, the hydraulic oil in the left chamber of the door closer is compressed, and the one-way valve is closed. The hydraulic oil can only flow out through the gap between the housing and the plunger, and flow back to the right chamber through the small hole on the plunger and two flow channels equipped with throttle valve cores. Therefore, the hydraulic oil constitutes resistance to the spring release. That is, buffering effect is achieved through throttling, so that the door closing speed is controlled. The throttle valve on the valve body is adjustable, capable of controlling variable door closing speed for different strokes.

The currently commercially available door closers have the following defect during use. Although the door closer can restore the opened door to the closed state thereof, it cannot maintain the opened or closed state thereof, that affects the usage.

SUMMARY OF THE INVENTION

It is an objective of the present invention to provide an eccentric cam action door closer for a glass door, which can solve the technical problem in the existing technology that the door closer cannot maintain the opened or closed state thereof.

To attain the above objective, the embodiment of the present invention provides an eccentric cam action door closer for a glass door, which includes:

a housing, the housing being provided therein along the axis direction thereof with an inner chamber;

a cam shaft, the cam shaft being rotatably supported in the housing, the cam shaft being equipped with an eccentric cam rotating simultaneously with the cam shaft;

a valve assembly, the valve assembly being slidingly disposed in the inner chamber and located at the left side of the eccentric cam; and a piston pressing assembly, the piston pressing assembly being slidingly disposed in the inner chamber and located at the right side of the eccentric cam;

wherein the piston pressing assembly is equipped at an end thereof close to the eccentric cam with a first roller and a second roller; the eccentric cam is provided on an outer peripheral surface thereof with a first closing arc recess and a second closing arc recess for closing positioning, and a first opening arc recess and a second opening arc recess for opening positioning;

in the closed state, the first roller is embedded in the first closing arc recess, and the second roller is embedded in the second closing arc recess; in the clockwise fully opened state, the first roller is embedded in the first opening arc recess; in the counterclockwise fully opened state, the second roller is embedded in the second opening arc recess.

Optionally, the first roller and the second roller are configured to be consistently abutted against the outer peripheral surface of the eccentric cam regardless of the rotational position of the eccentric cam, so as to prevent the eccentric cam from a gap with respect to the first roller and the second roller.

Optionally, the piston pressing assembly is provided therein with a spring member for pushing the first roller and the second roller to be consistently flexibly abutted against the outer peripheral surface of the eccentric cam.

Optionally, the piston pressing assembly further includes a pressing piston slidingly disposed in the inner chamber; an end of the spring member is abutted against the housing; another end of the spring member is inserted in the pressing piston and abutted against the pressing piston; at the same time the pressing piston is equipped at an end thereof close to the eccentric cam with two fixed pins disposed apart; the first roller and the second roller are rotationally installed on the two fixed pins respectively.

Optionally, the spring member includes an inner spring and an outer spring; the outer spring is sleeved outside the inner spring; an end of the outer spring and the inner spring are abutted against the housing at the same time; another end of the outer spring and the inner spring are inserted in the pressing piston and abutted against the pressing piston at the same time.

Optionally, the valve assembly partitions the inner chamber into a first oil channel and a second oil channel, which are located at two sides of the valve assembly respectively; the valve assembly is adapted to control the communication between the first oil channel and the second oil channel; at the same time the piston pressing assembly is provided therein with a third oil channel communicating with the second oil channel.

Optionally, the valve assembly includes:

a valve piston, the valve piston being slidingly disposed in the inner chamber;

a valve body, the valve body being installed in the valve piston, at the same time the valve body being provided therethrough with a valve flow channel communicating with the first oil channel and the second oil channel;

a valve core member, the valve core member being movably disposed in the valve flow channel for realizing the open or shut of the valve flow channel; and a valve core spring, the valve core spring being accommodated in the valve flow channel, an end of the valve core spring being connected with the valve body, another end of the valve core spring being connected with the valve core member for driving the valve core member to shut off the valve flow channel.

Optionally, the housing is equipped with a first bushing correspondingly to the front end of the cam shaft; the housing is equipped with a positionally limiting installation seat correspondingly to the rear end of the cam shaft, and at the same time the positionally limiting installation seat is equipped with a second bushing; the midpoints of the first bushing and the second bushing are located on a same axis; the cam shaft is inserted in the first bushing and the second bushing.

The above-described one or a plurality of technical scenarios of the eccentric cam action door closer for the glass door provided by the embodiment of the present invention at least has one of the following technical effects. The eccentric cam action door closer for the glass door is novel in structure. The door body of the door is installed on the housing. By the matching of the first roller and second roller equipped on the piston pressing assembly with the eccentric cam on the cam shaft, it is realized that the door closer stably keeps the door in the opened or closed state. When the door is clockwise opened in place, the first roller is embedded in the first opening arc recess and thereby fixed relative to the eccentric cam. When the door is counterclockwise opened in place, the second roller is embedded in the second opening arc recess and thereby fixed relative to the eccentric cam. When the door is closed in place, the first roller and the second roller are embedded in the first closing arc recess and the second closing arc recess respectively and thereby fixed relative to the eccentric cam. Thus, the cam shaft is stopped from continuing rotating in the housing, achieving the effect of fixing the door opening and closing angle in a stuck point positioning manner, at last achieving the purpose of positionally stopping the door, that has high reliability.

BRIEF DESCRIPTION OF THE DRAWINGS

In order to more clearly illustrate the technical scenarios in the embodiment of the present invention, the accompanying figures that need to be used in the description of the embodiment or the prior art will be briefly introduced below. Obviously, the accompanying figures in the following description are only some embodiments of the present invention. For those skilled in this field, other figures can be obtained based on these figures without exerting creative effort.

DETAILED DESCRIPTION OF THE INVENTION

Figure 1:
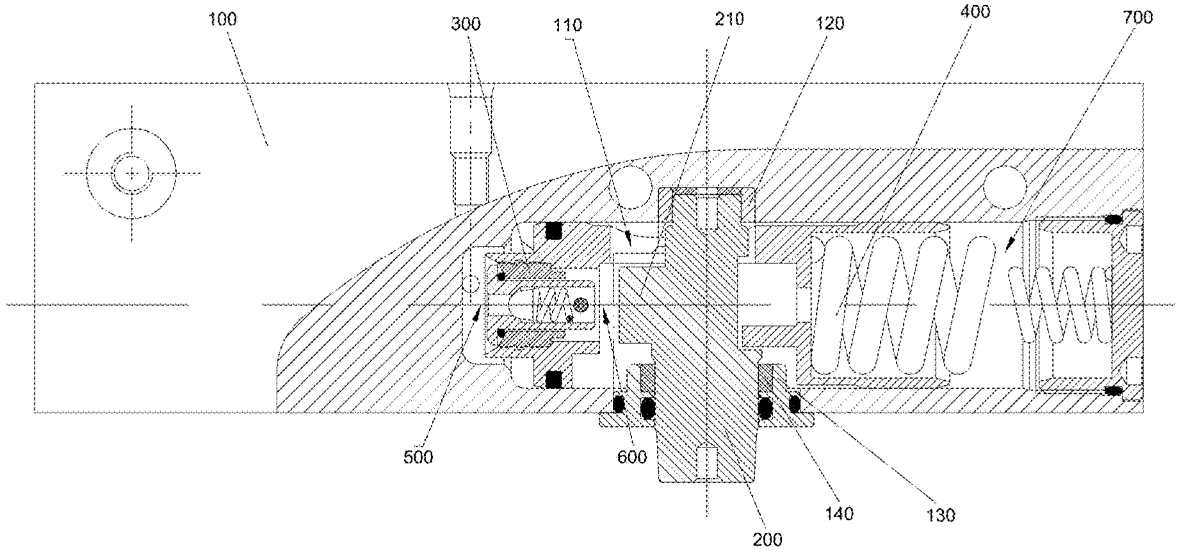
FIG. 1 is a first schematic view of the internal structure of the eccentric cam action door closer for the glass door provided by the embodiment of the present invention.

Embodiments of the present invention are described in detail below. The embodiments are illustrated in the accompanying figures, wherein same or similar reference numerals throughout represent same or similar elements or elements with same or similar functions. The following embodiments described with reference to the accompanying figures are illustrative, intended to explain the embodiments of the present invention, and cannot be understood as limitations of the present invention.

In the description of the embodiments of the present invention, it should be understood that the orientation or positional relationship indicated by the terms 'length', 'width', 'upper', 'lower', 'front', 'rear', 'left', 'right', 'vertical', 'horizontal', 'top', 'bottom', 'inner', 'outer', and so on are on the basis of the orientation or positional relationship shown in the accompanying figures, just for the convenience of describing the embodiments of the present invention and simplifying the description, not indicating or implying the mentioned device or element should have the specific orientation or be composed and operated with the specific orientation, and thereby cannot be understood as limitations of the present invention.

Besides, the terms 'first' and 'second' are used for the descriptive purpose only, and cannot be understood as indicating or implying the relative importance or implying specific amount of the mentioned technical feature. Thus, features prescribed with 'first' and 'second' may explicitly or implicitly include one or more the features. In the description of the embodiments of the present invention, 'a plurality of' means two or more than two, unless there is additional explicit and specific limitation.

In the embodiments of the present invention, unless there is additional explicit provision and limitation, the terms 'install', 'link', 'connect', 'fix', and so on should be understood broadly. For example, they may refer to fixed connection, or may refer to detachable connection, or being an integral; they may refer to mechanical connection, or may refer to electrical connection; they may refer to direct connection, or indirect connection through intermedium, or may refer to inner communication between two elements or interaction between two elements. For those skilled in this field, the specific meanings of the aforementioned terms in the embodiments of the present invention can be understood according to specific conditions.

Figure 2:
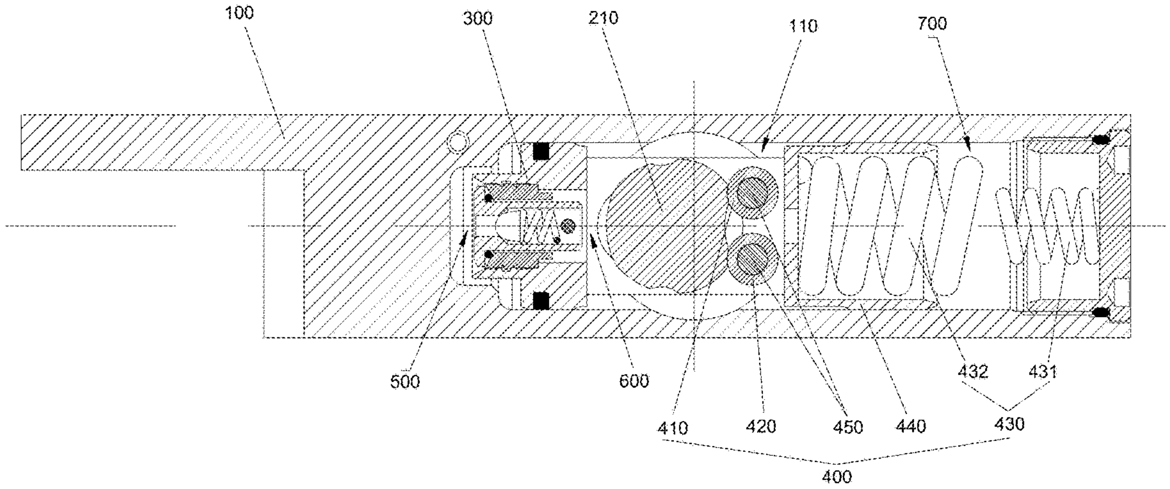
FIG. 2 is a second schematic view of the internal structure of the eccentric cam action door closer for the glass door provided by the embodiment of the present invention.
Figure 3:
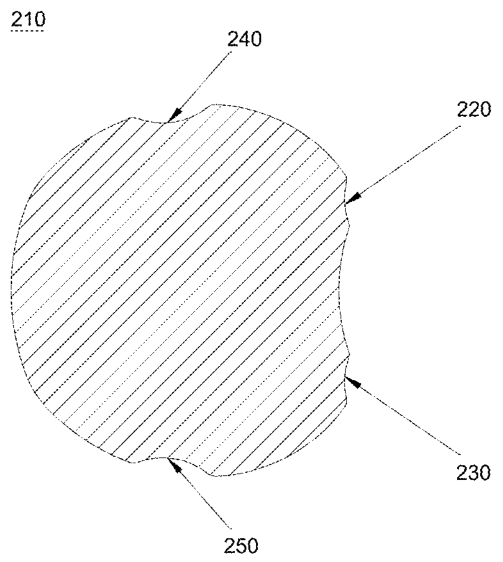
FIG. 3 is a schematic view of the structure of the eccentric cam provided by the embodiment of the present invention.

In a first embodiment of the present invention, as shown in FIGS. 1-3, a stuck point positioning eccentric cam 210 action door closer is provided, which includes:

- a housing 100, the housing 100 being provided therein along the axis direction thereof with an inner chamber 110;
- a cam shaft 200, the cam shaft 200 being rotatably supported in the housing 100, the cam shaft 200 being equipped with an eccentric cam 210 rotating simultaneously with the cam shaft 200;
- a valve assembly 300, the valve assembly 300 being slidingly disposed in the inner chamber 110 and located at the left side of the eccentric cam 210; and
- a piston pressing assembly 400, the piston pressing assembly 400 being slidingly disposed in the inner chamber 110 and located at the right side of the eccentric cam 210;
- wherein the piston pressing assembly 400 is equipped at an end thereof close to the eccentric cam 210 with a first roller 410 and a second roller 420; the eccentric cam 210 is provided on the outer peripheral surface thereof with a first closing arc recess 220 and a second closing arc recess 230 for closing positioning, and a first opening arc recess 240 and a second opening arc recess 250 for opening positioning;
- in the closed state, the first roller 410 is embedded in the first closing arc recess 220, and the second roller 420 is embedded in the second closing arc recess 230; in the clockwise fully opened state, the first roller 410 is embedded in the first opening arc recess 240; in the counterclockwise fully opened state, the second roller 420 is embedded in the second opening arc recess 250.

Specifically, in this embodiment, the stuck point positioning eccentric cam 210 action door closer is novel in structure. The door body of the door is installed on the housing 100. By the matching of the first roller 410 and second roller 420 equipped on the piston pressing assembly 400 with the eccentric cam 210 on the cam shaft 200, it is realized that the door closer stably keeps the door in the opened or closed state. When the door is clockwise opened in place, the first roller 410 is embedded in the first opening arc recess 240 and thereby fixed relative to the eccentric cam 210. When the door is counterclockwise opened in place, the second roller 420 is embedded in the second opening arc recess 250 and thereby fixed relative to the eccentric cam 210. When the door is closed in place, the first roller 410 and the second roller 420 are embedded in the first closing arc recess 220 and the second closing arc recess 230 respectively and thereby fixed relative to the eccentric cam 210. Thus, the cam shaft 200 is stopped from continuing rotating in the housing 100, thereby achieving the effect of fixing the door opening and closing angle in a stuck point positioning manner, at last achieving the purpose of positionally stopping the door, that has high reliability.

In a second embodiment of the present invention, as shown in FIG. 2, the first roller 410 and the second roller 420 are configured to be consistently abutted against the outer peripheral surface of the eccentric cam 210 regardless of the rotational position of the eccentric cam 210, so as to prevent the eccentric cam 210 from a gap with respect to the first roller 410 and the second roller 420.

Specifically, in this embodiment, the first roller 410 and the second roller 420 are consistently abutted against the outer peripheral surface of the eccentric cam 210, so the cam shaft 200 receives the damping effect generated from the first roller 410 and the second roller 420 to the eccentric cam 210 during the rotation of the housing 100, that lowers the transient door closing speed. Thus, it is realized that the door closer achieves sufficient buffering when the door closes, thereby raising the buffering effect of the door closer.

The other parts of this embodiment are the same with the first embodiment. The features unexplained in this embodiment all adopt the explanation in the first embodiment, not repeatedly described here.

In a third embodiment of the present invention, as shown in FIG. 2, the piston pressing assembly 400 is provided therein with a spring member 430 for pushing the first roller 410 and the second roller 420 to be consistently flexibly abutted against the outer peripheral surface of the eccentric cam 210.

Specifically, in this embodiment, the spring member 430 has certain elasticity. The moving first roller 410 and second roller 420 are flexibly abutted against the outer peripheral surface of the eccentric cam 210 by the spring member 430, thereby realizing the effect of fixedly clamping the eccentric cam 210 flexibly. That avoids excessive press which may cause damage to the eccentric cam 210, and improves the use effect.

The other parts of this embodiment are the same with the second embodiment. The features unexplained in this embodiment all adopt the explanation in the second embodiment, not repeatedly described here.

In a fourth embodiment of the present invention, as shown in FIG. 2, the piston pressing assembly 400 further includes a pressing piston 440 slidingly disposed in the inner chamber 110. An end of the spring member 430 is abutted against the housing 100. Another end of the spring member 430 is inserted in the pressing piston 440 and abutted against the pressing piston 440. At the same time, the pressing piston 440 is equipped at an end thereof close to the eccentric cam 210 with two fixed pins 450 disposed apart. The first roller 410 and the second roller 420 are rotationally installed on the two fixed pins 450 respectively.

Specifically, in this embodiment, the pressing piston 440 is slidingly fit with the inner wall of the inner chamber 110, that reduces the direction guiding structure in coordination with the axial direction of the pressing piston 440. During the use, the pressing piston 440 is moved by being pushed by the spring member 430. Under the direction guiding effect of the inner chamber 110, the pressing piston 440 is moved along the length direction of the housing 100, so as to push the first roller 410 and the second roller 420 to be accurately abutted on the eccentric cam 210, raising the operational reliability.

The other parts of this embodiment are the same with the third embodiment. The features unexplained in this embodiment all adopt the explanation in the third embodiment, not repeatedly described here.

In a fifth embodiment of the present invention, as shown in FIG. 2, the spring member 430 includes an inner spring 431 and an outer spring 432. The outer spring 432 is sleeved outside the inner spring 431. An end of the outer spring 432 and the inner spring 431 are abutted against the housing 100 at the same time. Another end of the outer spring 432 and the inner spring 431 are inserted in the pressing piston 440 and abutted against the pressing piston 440 at the same time.

Specifically, in this embodiment, the spring member 430 has simple structure and reasonable design. When the spring member 430 receives a force and be lengthened or shortened, the inner spring 431 and the outer spring 432 are both correspondingly lengthened or shortened without interference with each other. Therefore, the inner spring 431 and the outer spring 432 are uneasy to be deformed when used together, effectively raising the service life of the inner spring 431 and the outer spring 432. The composite design highly increases the elasticity of the spring member 430, ensuring the perpendicular stability of the spring force and effectively preventing the inner spring 431 and the outer spring 432 from damage due to excessive load.

The other parts of this embodiment are the same with the fourth embodiment. The features unexplained in this embodiment all adopt the explanation in the fourth embodiment, not repeatedly described here.

In a sixth embodiment of the present invention, as shown in FIGS. 1-2, the valve assembly 300 partitions the inner chamber 110 into a first oil channel 500 and a second oil channel 600, which are located at two sides of the valve assembly 300 respectively. The valve assembly 300 is adapted to control the communication between the first oil channel 500 and the second oil channel 600. At the same time, the piston pressing assembly 400 is provided therein with a third oil channel 700 communicating with the second oil channel 600.

Specifically, in this embodiment, the first oil channel 500 and the third oil channel 700 can be filled with hydraulic oil. The housing 100 can rotate along with the rotation of the door body, so as to change the position of the first roller 410 and second roller 420 on the eccentric cam 210, thereby changing the volume of the third oil channel 700. Then, the hydraulic oil flows between the second oil channel 600 and the third oil channel 700, resulting in a pressure difference between the first oil channel 500 and the second oil channel 600. That changes the status of the valve assembly 300 to cause the hydraulic oil corresponding flowing between the first oil channel 500 and the second oil channel 600 to balance the pressure difference between the first oil channel 500 and the second oil channel 600. That is, the hydraulic oil in the first oil channel 500, the second oil channel 600 and the third oil channel 700 can flow in coordination with the action of the door body.

The other parts of this embodiment are the same with the first embodiment. The features unexplained in this embodiment all adopt the explanation in the first embodiment, not repeatedly described here.

Figure 4:
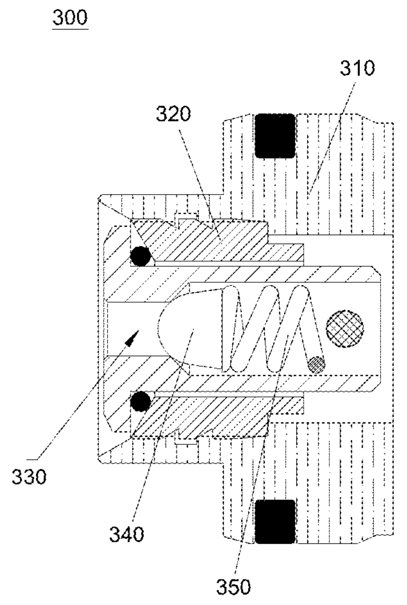
FIG. 4 is a schematic view of the internal structure of the valve assembly provided by the embodiment of the present invention.

In a seventh embodiment of the present invention, as shown in FIG. 4, the valve assembly 300 includes:

a valve piston 310, the valve piston 310 being slidingly disposed in the inner chamber 110;

a valve body 320, the valve body 320 being installed in the valve piston 310, at the same time the valve body 320 being provided therethrough with a valve flow channel 330 communicating with the first oil channel 500 and the second oil channel 600;

a valve core member 340, the valve core member 340 being movably disposed in the valve flow channel 330 for realizing the open or shut of the valve flow channel 330; and a valve core spring 350, the valve core spring 350 being accommodated in the valve flow channel 330, an end of the valve core spring 350 being connected with the valve body 320, another end of the valve core spring 350 being connected with the valve core member 340 for driving the valve core member 340 to shut off the valve flow channel 330.

Specifically, in this embodiment, the movement of the valve core member 340 can realize the open or shut of the valve flow channel 330. The disposal of the valve core spring 350 can ensure the accuracy of the movement of the valve core member 340. When the first oil channel 500 and the second oil channel 600 have a pressure difference therebetween, it can push the valve core member 340 to overcome the elastic force of the valve core spring 350 so as to move in the valve flow channel 330 to realize the open of the valve flow channel 330. After the pressure difference between the first oil channel 500 and the second oil channel 600 is balanced, the valve core member 340 is pushed by the elastic force of the valve core spring 350 to restore its position by moving in the valve flow channel 330, thereby realizing the shut of the valve flow channel 330. The status of the valve assembly 300 is automatically changed, and the reliability is high.

The other parts of this embodiment are the same with the sixth embodiment. The features unexplained in this embodiment all adopt the explanation in the sixth embodiment, not repeatedly described here.

In an eighth embodiment of the present invention, as shown in FIG. 1, the housing 100 is equipped with a first bushing 120 correspondingly to the front end of the cam shaft 200. The housing 100 is equipped with a positionally limiting installation seat 130 correspondingly to the rear end of the cam shaft 200, and at the same time the positionally limiting installation seat 130 is equipped with a second bushing 140. The midpoints of the first bushing 120 and the second bushing 140 are located on a same axis. The cam shaft 200 is inserted in the first bushing 120 and the second bushing 140.

Specifically, in this embodiment, the primary function of the first bushing 120 and the second bushing 140 is to fix the cam shaft 200. During the motion of the cam shaft 200, the first bushing 120 and the second bushing 140 generate the vibration reducing effect, and can help the cam shaft 200 to stay balanced and stable, and at the same time can also reduce friction and wear, increasing the service life of the cam shaft 200.

The other parts of this embodiment are the same with the first embodiment. The features unexplained in this embodiment all adopt the explanation in the first embodiment, not repeatedly described here.

The above description is only the preferred embodiments of the present invention, not intended to limit the present invention. Any modification, equivalent substitution and improvement made within the spirit and principle of the present invention should be included within the claimed scope of the present invention.

What is claimed is:

1. An eccentric cam action door closer for a glass door, the eccentric cam action door closer comprising:

a housing, the housing being provided therein along an axis direction thereof with an inner chamber;

a cam shaft, the cam shaft being rotatably supported in the housing, the cam shaft being equipped with an eccentric cam rotating simultaneously with the cam shaft;

a valve assembly, the valve assembly being slidingly disposed in the inner chamber and located at a left side of the eccentric cam; and a piston pressing assembly, the piston pressing assembly being slidingly disposed in the inner chamber and located at a right side of the eccentric cam;

wherein the piston pressing assembly is equipped at an end thereof close to the eccentric cam with a first roller and a second roller; the eccentric cam is provided on an outer peripheral surface thereof with a first closing arc recess and a second closing arc recess for closing positioning, and a first opening arc recess and a second opening arc recess for opening positioning;

in a closed state, the first roller is embedded in the first closing arc recess, and the second roller is embedded in the second closing arc recess; in a clockwise fully opened state, the first roller is embedded in the first opening arc recess; in a counterclockwise fully opened state, the second roller is embedded in the second opening arc recess-;

wherein the valve assembly partitions the inner chamber into a first oil channel and a second oil channel, which are located at two sides of the valve assembly respectively; the valve assembly is adapted to control communication between the first oil channel and the second oil channel; at the same time the piston pressing assembly is provided therein with a third oil channel communicating with the second oil channel;

wherein the valve assembly comprises:

a valve piston, the valve piston being slidingly disposed in the inner chamber;

a valve body, the valve body being installed in the valve piston, at the same time the valve body being provided therethrough with a valve flow channel communicating with the first oil channel and the second oil channel;

a valve core member, the valve core member being movably disposed in the valve flow channel for realizing open or shut of the valve flow channel; and a valve core spring, the valve core spring being accommodated in the valve flow channel, an end of the valve core spring being connected with the valve body, another end of the valve core spring being connected with the valve core member for driving the valve core member to shut off the valve flow channel.

2. The eccentric cam action door closer as claimed in claim 1, wherein the first roller and the second roller are configured to be consistently abutted against the outer peripheral surface of the eccentric cam regardless of a rotational position of the eccentric cam, so as to prevent the eccentric cam from a gap with respect to the first roller and the second roller.

3. The eccentric cam action door closer as claimed in claim 2, wherein the piston pressing assembly is provided therein with a spring member for pushing the first roller and the second roller to be consistently flexibly abutted against the outer peripheral surface of the eccentric cam.

4. The eccentric cam action door closer as claimed in claim 3, wherein the piston pressing assembly further comprises a pressing piston slidingly disposed in the inner chamber; an end of the spring member is abutted against the housing; another end of the spring member is inserted in the pressing piston and abutted against the pressing piston; at the same time the pressing piston is equipped at an end thereof close to the eccentric cam with two fixed pins disposed apart; the first roller and the second roller are rotationally installed on the two fixed pins respectively.

5. The eccentric cam action door closer as claimed in claim 4, wherein the spring member comprises an inner spring and an outer spring; the outer spring is sleeved outside the inner spring; an end of the outer spring and the inner spring are abutted against the housing at the same time; another end of the outer spring and the inner spring are inserted in the pressing piston and abutted against the pressing piston at the same time.

6. The eccentric cam action door closer as claimed in claim 1, wherein the housing is equipped with a first bushing correspondingly to a front end of the cam shaft; the housing is equipped with a positionally limiting installation seat correspondingly to a rear end of the cam shaft, and at the same time the positionally limiting installation seat is equipped with a second bushing; midpoints of the first bushing and the second bushing are located on a same axis; the cam shaft is inserted in the first bushing and the second bushing.

* * * * *